United States Patent
Chen et al.

(10) Patent No.: US 8,622,404 B2
(45) Date of Patent: Jan. 7, 2014

(54) INFANT CARRIER APPARATUS AND ITS ADJUSTING METHOD

(75) Inventors: Xuhui Chen, Central Hong Kong (HK); Fang Ming Li, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 108 days.

(21) Appl. No.: 13/077,693

(22) Filed: Mar. 31, 2011

(65) Prior Publication Data

US 2011/0248479 A1    Oct. 13, 2011

(30) Foreign Application Priority Data

Apr. 7, 2010   (CN) .......................... 2010 1 0144606

(51) Int. Cl.
*B62B 3/02*    (2006.01)

(52) U.S. Cl.
USPC ............... 280/47.36; 280/47.38; 280/647; 280/47.371

(58) Field of Classification Search
USPC .......... 280/47.38, 47.26, 47.36; 403/82–84, 403/91–95
See application file for complete search history.

(56) References Cited

U.S. PATENT DOCUMENTS

| | | | | |
|---|---|---|---|---|
| 2,791,437 A * | 5/1957 | Knarzer | ................... | 280/47.36 |
| 3,246,909 A * | 4/1966 | Siwek | ................... | 280/47.371 |
| 3,586,355 A * | 6/1971 | Magi | ................... | 403/91 |
| 3,955,240 A * | 5/1976 | Schuh et al. | ................... | 16/326 |
| 4,180,276 A * | 12/1979 | Kassai | ................... | 280/47.36 |
| 4,230,414 A * | 10/1980 | Cheshire | ................... | 403/95 |
| 4,479,665 A * | 10/1984 | Kassai | ................... | 280/644 |
| 4,540,306 A * | 9/1985 | Wang | ................... | 403/93 |
| 4,543,006 A * | 9/1985 | Wang | ................... | 403/93 |
| 4,577,986 A * | 3/1986 | Wang | ................... | 403/93 |
| 4,681,331 A * | 7/1987 | Glaser | ................... | 280/47.36 |
| 4,906,017 A * | 3/1990 | Kassai | ................... | 280/642 |
| 5,056,805 A * | 10/1991 | Wang | ................... | 280/47.36 |
| 5,110,150 A * | 5/1992 | Chen | ................... | 280/642 |
| 5,244,228 A * | 9/1993 | Chiu | ................... | 280/642 |
| 5,257,799 A * | 11/1993 | Cone et al. | ................... | 280/642 |
| 5,549,311 A * | 8/1996 | Huang | ................... | 280/47.36 |
| 5,765,958 A * | 6/1998 | Lan | ................... | 403/97 |
| 6,102,432 A * | 8/2000 | Cheng | ................... | 280/642 |
| 6,508,605 B1 * | 1/2003 | Cheng | ................... | 403/83 |
| 6,629,801 B2 * | 10/2003 | Cheng | ................... | 403/101 |
| 6,893,031 B2 * | 5/2005 | Suzuki | ................... | 280/47.36 |
| 6,910,708 B2 * | 6/2005 | Sack et al. | ................... | 280/642 |
| 6,938,914 B2 * | 9/2005 | Kassai et al. | ................... | 280/642 |

(Continued)

FOREIGN PATENT DOCUMENTS

EP   1327568 A1   7/2003
JP   2002284015   10/2002

*Primary Examiner* — John R Olszewski
*Assistant Examiner* — Steve Clemmons
(74) *Attorney, Agent, or Firm* — David I. Roche; Baker & McKenzie LLP (57) ABSTRACT

An infant carrier apparatus comprises a support frame having opposite first and second sides, a handle pivotally coupled with the support frame, and a stop mechanism. The handle is operable to rotate relative to the support frame between a first position inclined toward the first side, and a second position inclined toward the second side. The stop mechanism is adapted to arrest the handle at an intermediate position when the handle is rotated from the first position toward the second position, wherein the intermediate position is located between the first and second position. In addition, other embodiments also described a method of adjusting the infant carrier apparatus.

19 Claims, 10 Drawing Sheets

(56) References Cited

U.S. PATENT DOCUMENTS

| | | | |
|---|---|---|---|
| 7,401,803 B1 * | 7/2008 | Lai | 280/647 |
| 7,445,229 B2 * | 11/2008 | Dotsey et al. | 280/642 |
| 7,694,995 B2 * | 4/2010 | Dotsey et al. | 280/642 |
| 2002/0109336 A1 * | 8/2002 | Suzuki | 280/647 |
| 2003/0030252 A1 * | 2/2003 | Huang | 280/650 |
| 2003/0160432 A1 * | 8/2003 | Sack et al. | 280/642 |
| 2007/0132207 A1 * | 6/2007 | Moriguchi et al. | 280/642 |

* cited by examiner

INFANT CARRIER APPARATUS AND ITS ADJUSTING METHOD

CROSS-REFERENCE TO RELATED APPLICATION(S)

This application claims priority to China Patent Application No. 201010144606.4, which was filed on Apr. 7, 2010.

BACKGROUND

1. Field of the Invention

The present invention relates to an infant carrier apparatus and its adjusting method, and more particularly to an infant carrier apparatus and method that can prevent injury induced by accidental pinching of hands or legs.

2. Description of the Related Art

A stroller apparatus typically comprises a support frame provided with wheels, a seat assembly, a folding mechanism and a handle. After a child is placed in the seat, the parent can use the handle to push the stroller in movement. In traditional strollers, the seat assembly is usually oriented toward the front of the stroller in its direction of displacement. Because the child does not face the parent when seated in the stroller, no interaction is permitted between the child and the parent. To remedy this deficiency, some current approaches propose a stroller structure in which the orientation of the handle can be adjusted back and forth, whereby the child can be desirably seated facing the parent and the stroller displaced in either of two opposite directions. However, when the handle is adjusted from a first position inclined toward the front of the stroller to a second position inclined toward the rear, the close position of the handle with the support frame may create a clamping angle that can pinch the child's fingers or legs, causing potential risks of injury.

Therefore, there is a need for an infant carrier apparatus that can prevent accidental pinching during adjustment of the handle, and address at least the foregoing issues.

SUMMARY

The present application describes an infant carrier apparatus and its adjusting method that can prevent the occurrence of accidental pinching during adjustment of the handle.

In one embodiment, the infant carrier apparatus comprises a support frame having opposite first and second sides, a handle pivotally coupled with the support frame, and a stop mechanism. The handle is operable to rotate relative to the support frame between a first position inclined toward the first side, and a second position inclined toward the first side. The stop mechanism is adapted to stop the handle at an intermediate position when the handle is rotated from the first position toward the second position, wherein the intermediate position is located between the first and second position.

In another embodiment a method of adjusting the infant carrier apparatus is described. The method comprises pivoting the handle relative to the support frame in a direction of adjustment from a first position inclined toward the first side toward a second position inclined toward the second side, forcing the handle to stop at an intermediate position before the handle reaches the second position, wherein the handle is stopped at the intermediate position by the stop mechanism in an engaged state, and removing the engaged state of the stop mechanism and continuing to rotate the handle in the direction of adjustment from the intermediate position to the second position.

DETAILED DESCRIPTION OF THE EMBODIMENTS

Figure 1:
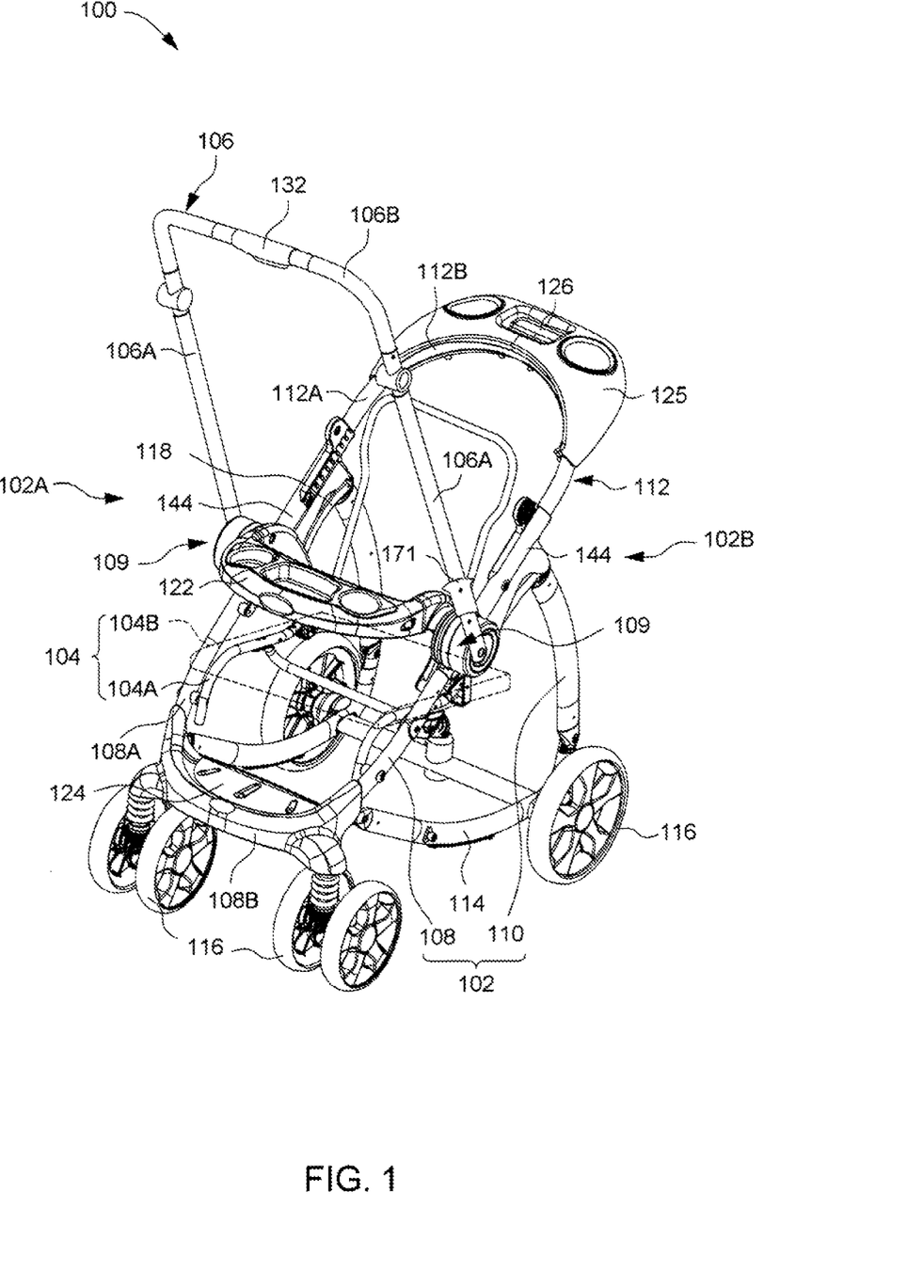
FIG. 1 is a schematic view illustrating one embodiment of an infant carrier apparatus.

FIG. 1 is a schematic view illustrating one embodiment of an infant carrier apparatus 100. The infant carrier apparatus 100, which is exemplary a baby stroller, can include a support frame 102, and a seat 104 and handle 106 respectively connected pivotally with the support frame 102. The support frame 102 can include a first frame portion 108, a second frame portion 112, a third frame portion 110, and linking elements 114. The first and third frame portions 108 and 110 can respectively define front and rear legs of the support frame 102, whereas the second frame portion 112 can be respectively coupled with upper ends of the first and third frame portions 108 and 110. Each of the handle 106, the first frame portion 108 and the second frame portion 112 can be respectively formed as a generally U-shaped tube assembly including left and right side segments (106A for the side segments of the handle 106, 108A for the side segments of the first frame portion 108, and 112A for the side segments of the second frame portion 112), and a transversal segment connected between the side segments (106B for the grasping segment of the handle 106, 108B for the transversal segment of the first frame portion 108, and 112B for the transversal segment of the second frame portion 112).

The left and right sides of the support frame 102 can have a symmetrical construction. More specifically, on each of the left and right sides, the side segments 106A, 108A and 112A can be respectively coupled with a hinge structure 109 that permits the second frame portion 112 and the handle 106 to respectively pivot relative to the first frame portion 108. Accordingly, the inclination of the handle 106 can be adjusted forward and rearward, and both the handle 106 and the second frame portion 112 can be folded relative to the first and third frame portions 108 and 110 to collapse the infant carrier apparatus 100.

On each of the left and right sides, the third frame portion 110 can have an upper end pivotally coupled with the corresponding side segment 112A of the second frame portion 112, and a lower end portion connected with the first frame portion 108 via one corresponding linking element 114. Multiple wheels 116 can be disposed at the lower ends of the first frame portion 108 and third frame portion 110 for displacement of the infant carrier apparatus 100 toward a first or front side 102A or a second or rear side 102B of the support frame 102.

The seat 104 can include a seat frame 104A, and a cushion 104B (shown with phantom lines) disposed thereon. However, in alternate embodiments, the seat 104 may include a seat board or fabric attached with a seat frame. The seat 104 is disposed between the left and right side of the support frame 102. The seat 104 can have a first or front end portion laterally coupled with the side segments 108A via pivot connections, and an opposite second or rear end portion laterally coupled pivotally with hang bars 118, which are in turn pivotally coupled with the side segments 112A of the second frame portion 112. When the infant carrier apparatus 100 is collapsed or deployed for use, the second frame portion 112 can rotate about a pivot axis defined by the hinge structures 109, causing the seat 104 to pivot relative to the first frame portion 108 via the pivotal connection of the hang bars 118.

Referring again to FIG. 1, a front upper region of the seat 104 can be provided with a first tray 122, which can be pivotally connected with opposing inner sides of the hinge structures 109. A footrest 124 can be affixed with the transversal segment 108B of the first frame portion 108 at a front lower position of the seat 104. The transversal segment 112B of the second frame portion 112 can be mounted with a second tray 125. The placement of the second tray 125 at a rear upper region of the seat 104 can be easily accessible to an adult caregiver, permitting convenient placement of various objects thereon.

The transversal segment 112B of the second frame portion 112 can also be provided with a frame adjustment control 126 operable to unlock a locking engagement between the first frame portion 108 and the second frame portion 112. Once unlocked, the second frame portion 112 and handle 106 can be pivoted toward the first side 102A of the support frame 102 to collapse the infant carrier apparatus 100.

Figure 2:
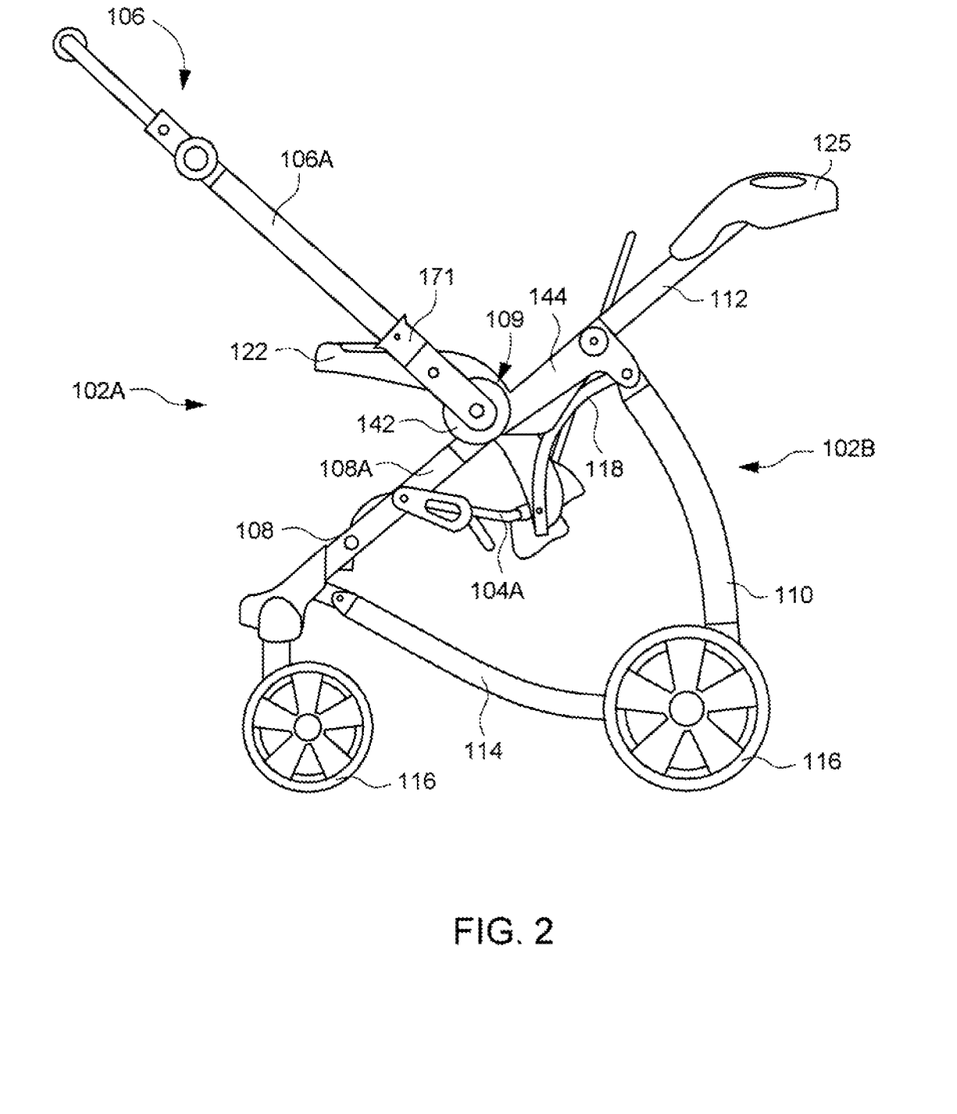
FIG. 2 is a schematic view illustrating the handle of the infant carrier apparatus inclined toward a first side.
Figure 3:
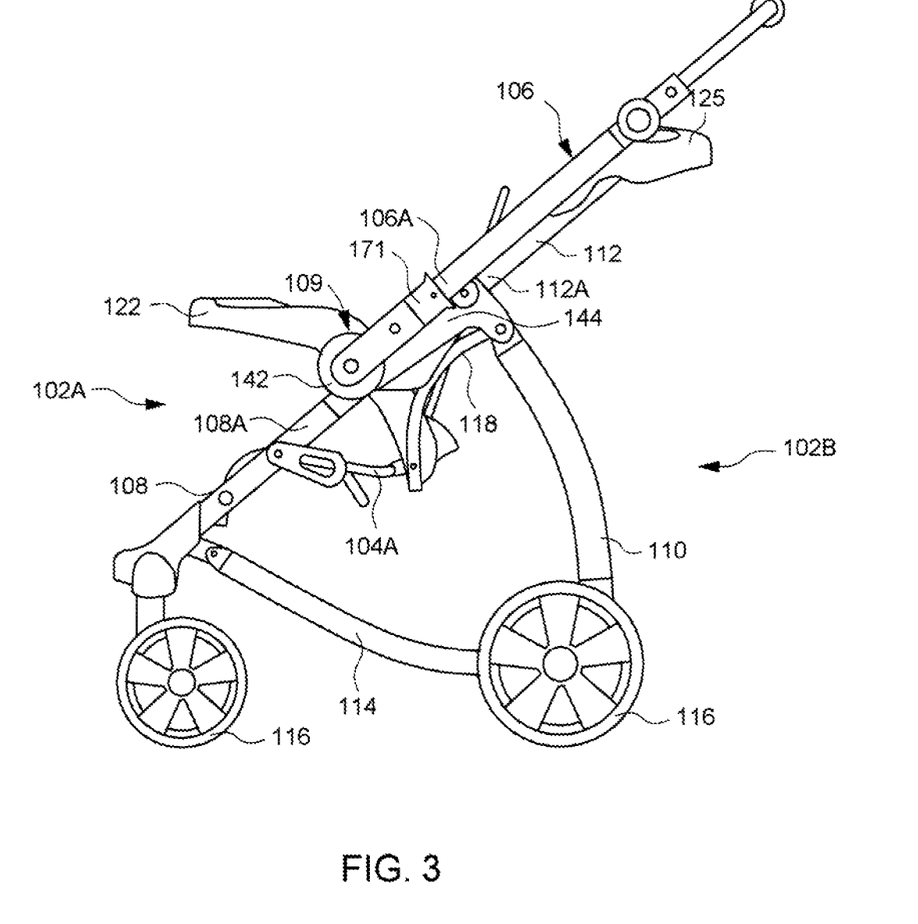
FIG. 3 is a schematic view illustrating the handle of the infant carrier apparatus inclined toward a second side.

FIGS. 2 and 3 are schematic views illustrating two different use configurations of the handle 106 respectively inclined toward the first side 102A and second side 102B. As shown, when the handle 106 is in a position inclined toward the second side 102B, the left/right side segment 106A of the handle 106 and the left/right side segment 112A of the second frame portion 112 can be located adjacent to each other and extend generally parallel along a same direction. The caregiver can therefore use the handle 106 to push the infant carrier apparatus 100 in movement toward the first side 102A. In this configuration, a lock mechanism 130 (shown in FIG. 5) assembled in the hinge structure 109 and operatively connected with a release control 132 on the grasping segment 106B can lock the handle 106 with the second frame portion 112. In contrast, when the handle 106 is adjusted to a position inclined toward the first side 102A, a caregiver can use the handle 106 to push the infant carrier apparatus 100 in movement toward the second side 102B.

Figure 4:
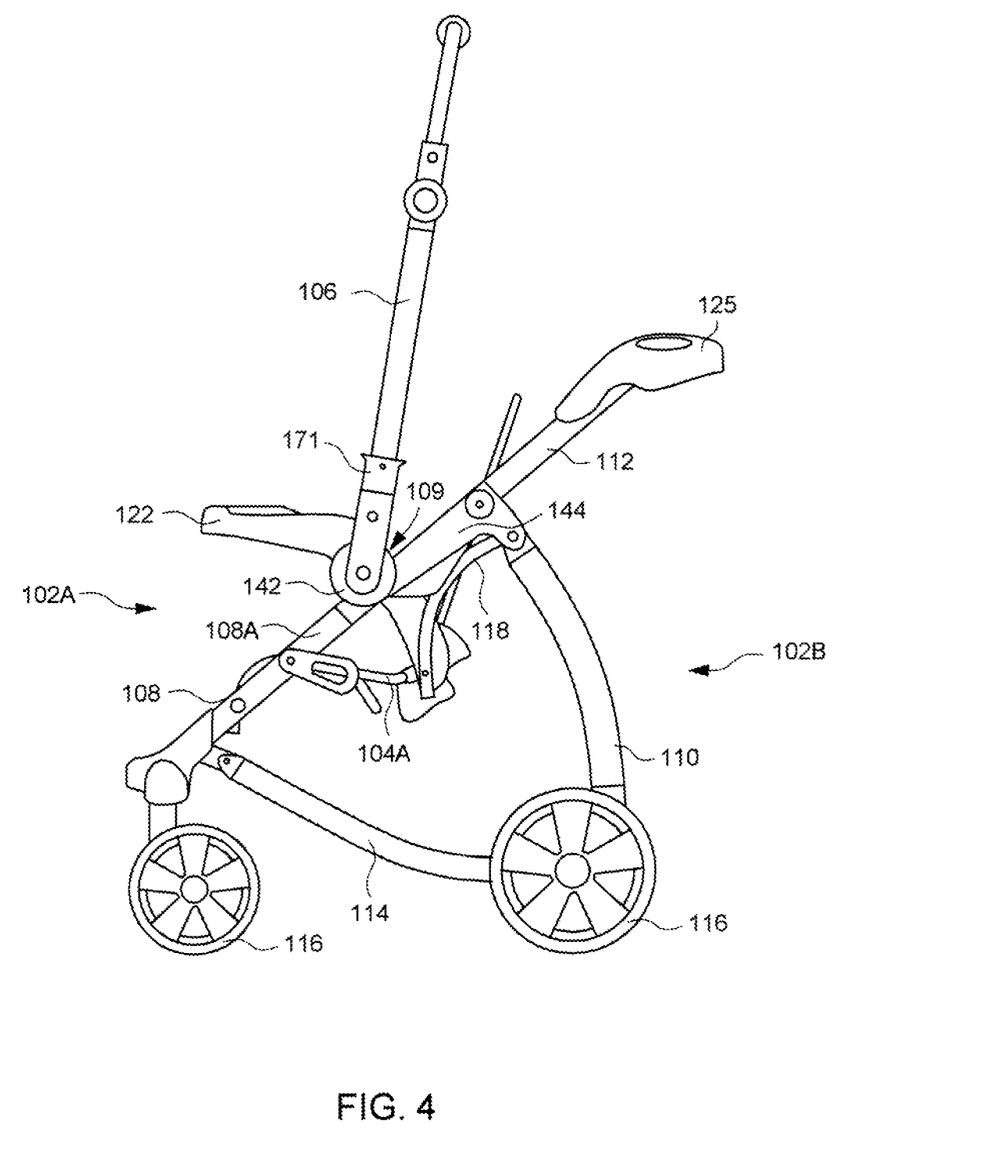
FIG. 4 is a schematic view illustrating an intermediate position of the handle between the first position shown in FIG. 2 and the second position shown in FIG. 3.

FIG. 4 is a schematic view illustrating an intermediate position of the handle 106 between the first position shown in FIG. 2 (i.e., inclined toward the first side 102A) and the second position shown in FIG. 3 (i.e., inclined toward the second side 102B). As it is adjusted from the first position to the second position, the handle 106 rotates toward the second frame portion 112 and forms with it an acute clamping angle that may accidentally catch and pinch a child's hand or leg. To prevent the occurrence of finger pinch accidents, a safety measure can be implemented in the form of a stop mechanism 134 (shown in FIG. 5) provided in the hinge structure 109. In the course of the handle 106 toward the second frame portion 112, the stop mechanism 134 can force the handle 106 to stop at a proper angular position away from the second frame portion 112. Once the caregiver has verified that there is no risk of finger pinch occurrences, a release actuator 166 provided on the handle 106 can be operated to release the stop mechanism 134 and permit the handle 106 to continue its adjustment from the intermediate position to the second position shown in FIG. 3.

Figure 5:
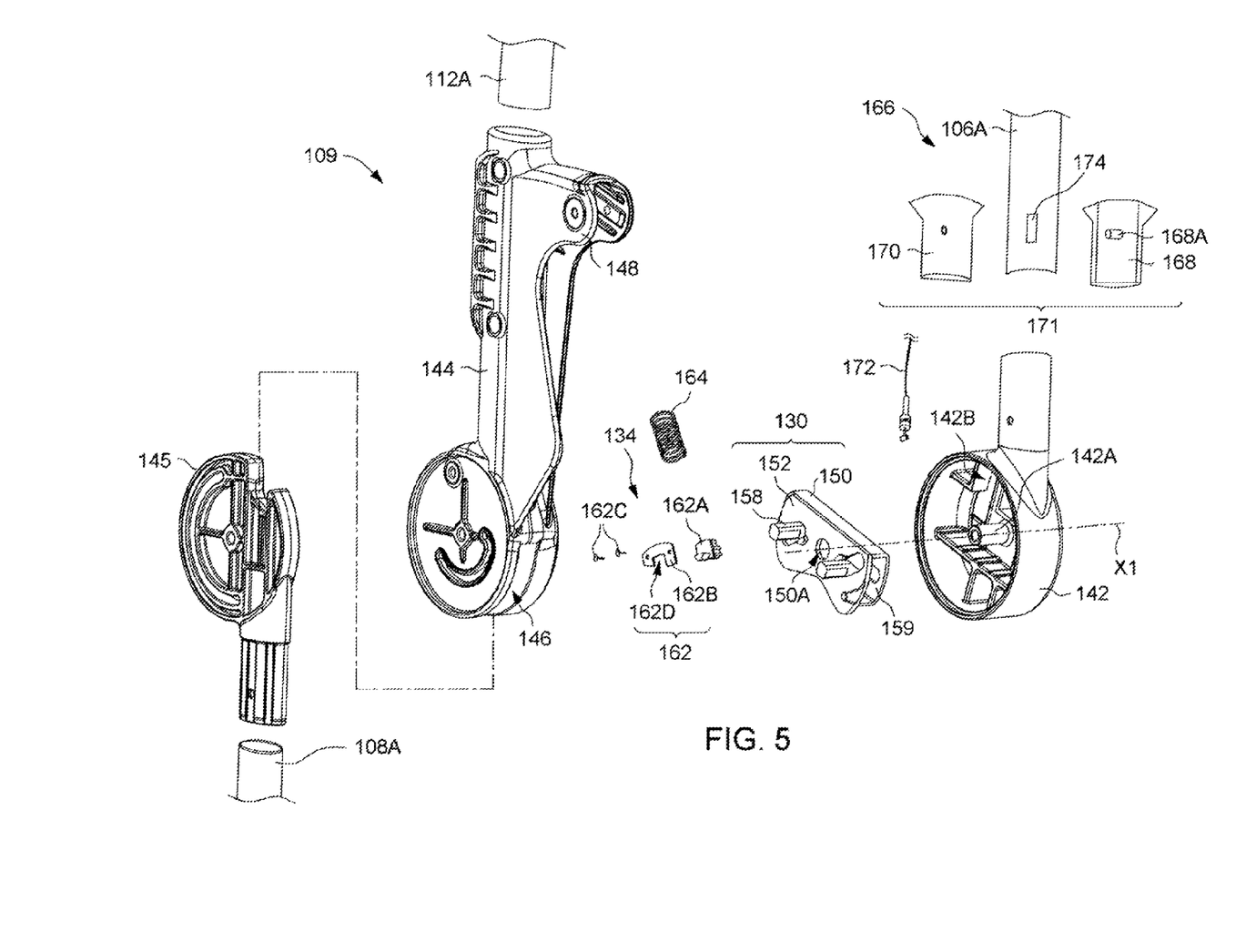
FIG. 5 is an exploded view illustrating the assembly of a lock mechanism and a stop mechanism in a hinge structure of the infant carrier apparatus.

In conjunction with FIGS. 1 and 4, FIG. 5 is an exploded view illustrating the assembly of the lock mechanism 130 and stop mechanism 134 in the hinge structure 109. For clarity, FIG. 5 only shows the assembly implemented at one lateral side of the support frame 102. It will be understood that the other side may also have a same construction. As shown in FIG. 5, the side segment 106A of the handle 106 can be affixed with a first coupling element 142. Moreover, a portion of the support frame 102, e.g., the side segment 112A of the second frame portion 112, can be affixed with a coupling bracket 144. The first coupling element 142 can include a shell portion where is formed a shaft portion 142A adapted to pivotally connect with the coupling bracket 144. The handle 106 can thereby rotate relative to the support frame 102 about a pivot axis X1 defined by the shaft portion 142A.

The coupling bracket 144 has a distal end portion forming a generally cylindrical axle housing provided with a slot 146 on a lateral side. A second coupling element 145, which is affixed with the side segment 108A of the first frame portion 108, can be assembled through the slot 146 for pivotally connecting the first frame portion 108 with the second frame portion 112. At an opposite side of the slot 146, the coupling bracket 144 can further include an extension forming an ear 148 where the third frame portion 110 can be pivotally connected. The lock mechanism 130 and the stop mechanism 134 can be respectively assembled and enclosed between the first coupling element 142 and the coupling bracket 144.

Figure 6:
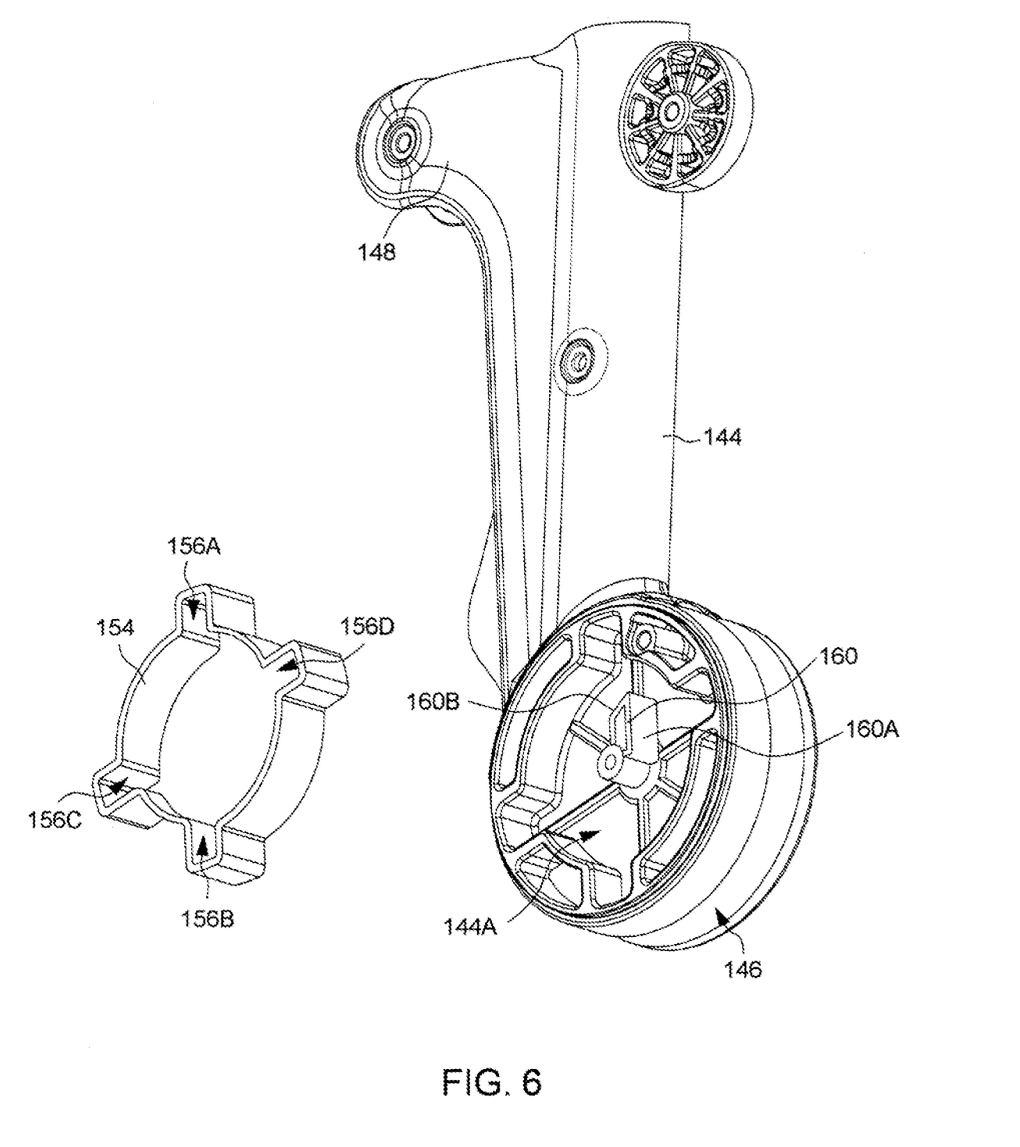
FIG. 6 is a schematic view illustrating a side of the coupling bracket affixed with the support frame that is adapted to connect with the first coupling element of the handle side segment.
Figure 7:
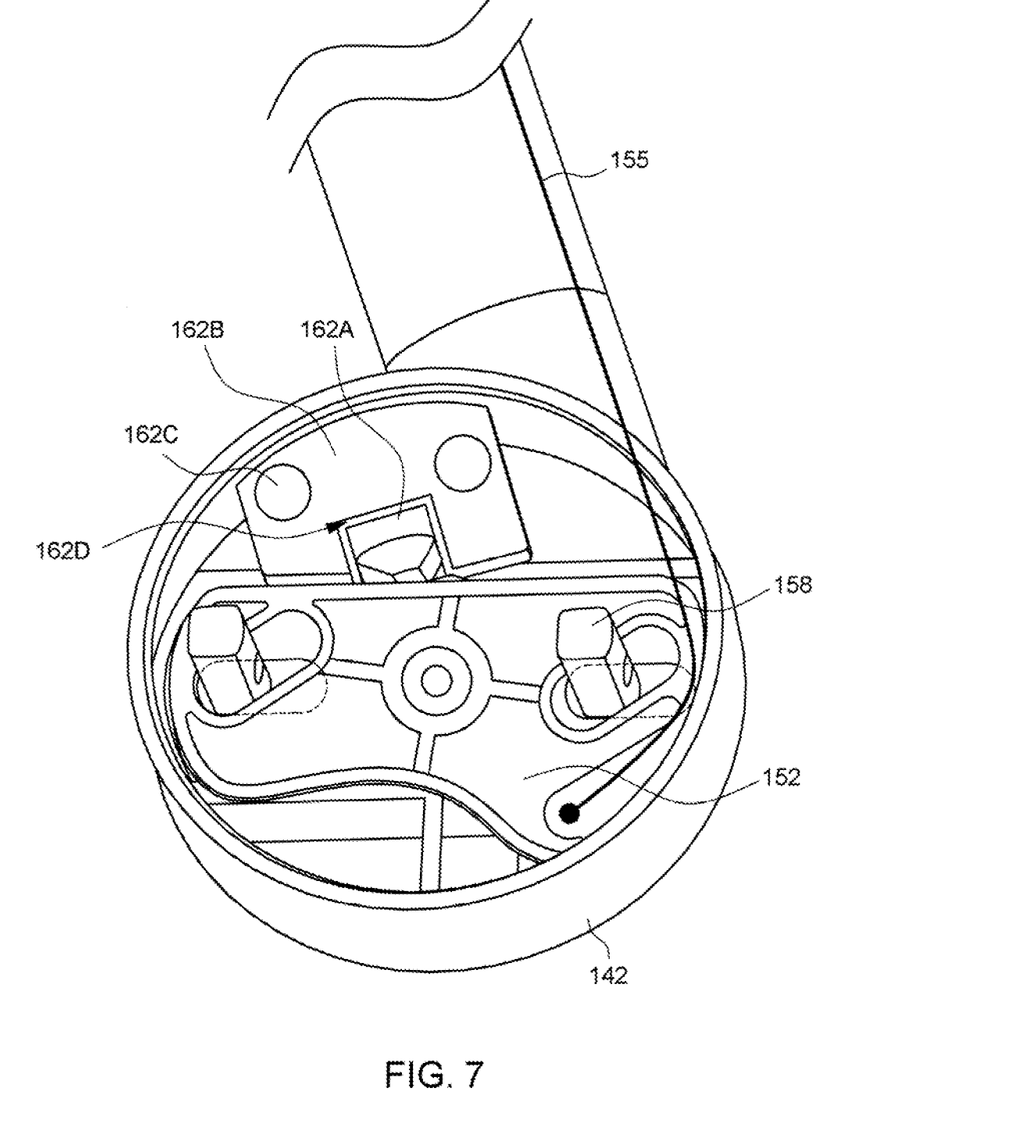
FIG. 7 is a schematic view illustrating the stop mechanism assembled with the first coupling element.

FIG. 6 is a schematic view illustrating a side of the coupling bracket 144 adapted to connect with the first coupling element 142 of the handle side segment 106A. FIG. 7 is a schematic view illustrating the stop mechanism 134 assembled with the first coupling element 142. Referring to FIGS. 5-7, the lock mechanism 130 can include a latch unit 150, a rotary plate 152, a rigid holder cage 154 and a transmission cable 155. The latch unit 150 and the rotary plate 152 can be disposed at least partially in an inner cavity 142B of the first coupling element 142. The transmission cable 155 can have two opposite ends respectively connected with the release control 132 (FIG. 1) and the rotary plate 152. By operating the release control 132, the transmission cable 155 can be drawn in movement to cause rotation of the rotary plate 152, which in turn drives movement of the latch unit 150 to unlock the handle 106 and allow its adjustment.

Referring to FIG. 5, the latch unit 150 can include two latching bolts 158 movably assembled with a casing 159. When the latch unit 150 is assembled, the shaft portion 142A passes through a hole 150A of the casing 159, such that the two latching bolts 158 are located at two diametrically opposite sides of the shaft portion 142A. At a side of the casing 159, the latching bolts 158 can be movably engaged through associated guide slots formed in the rotary plate 152, such that rotation of the rotary plate 152 can drive the two latching bolts 158 to either move toward the shaft portion 142A for unlocking disengagement, or away from the shaft portion 142A for locking engagement.

Referring to FIG. 6, the coupling bracket 144 can include an inner cavity 144A facing the rotary plate 152. The holder cage 154 is fixedly secured in the inner cavity 144A, and includes a plurality of locking slots 156A, 156B, 156C and 156D disposed at different radial directions relative to the pivot axis X1. Once assembled, the latching bolts 158 can lie in the inner cavity 144A and within the boundaries of the holder cage 154. Depending on whether the handle 106 is adjusted to the first position shown in FIG. 2 or the second position shown in FIG. 3, the latching bolts 158 can respectively engage with the locking slots 156A and 156B or with the locking slots 156C and 156D to lock the handle 106 in place and block its rotation relative to the support frame 102.

In conjunction with FIGS. 5-7, FIG. 10 is a cross-sectional view taken along a radial direction illustrating the assembly of the stop mechanism 134. For clarity, the representation of connecting portions associated with the first frame portion 108 is omitted in FIG. 10. Referring to FIGS. 5-7 and 10, the stop mechanism 134 can include first and second abutting elements 160 and 162, and a spring 164. The first abutting element 160 can be affixed at a position of the coupling bracket 144 in the area of the inner cavity 144A, for example adjacent to a center of the inner cavity 144A. The first abutting element 160 can extend in a radial direction from the pivot axis X1, and have a polygonal shape including contiguous first and second sidewalls 160A and 160B. The first sidewall 160A may extend substantially parallel to a radial direction from the pivot axis X1, whereas the second sidewall 160B can be beveled relative to the first sidewall 160A.

Figure 10:
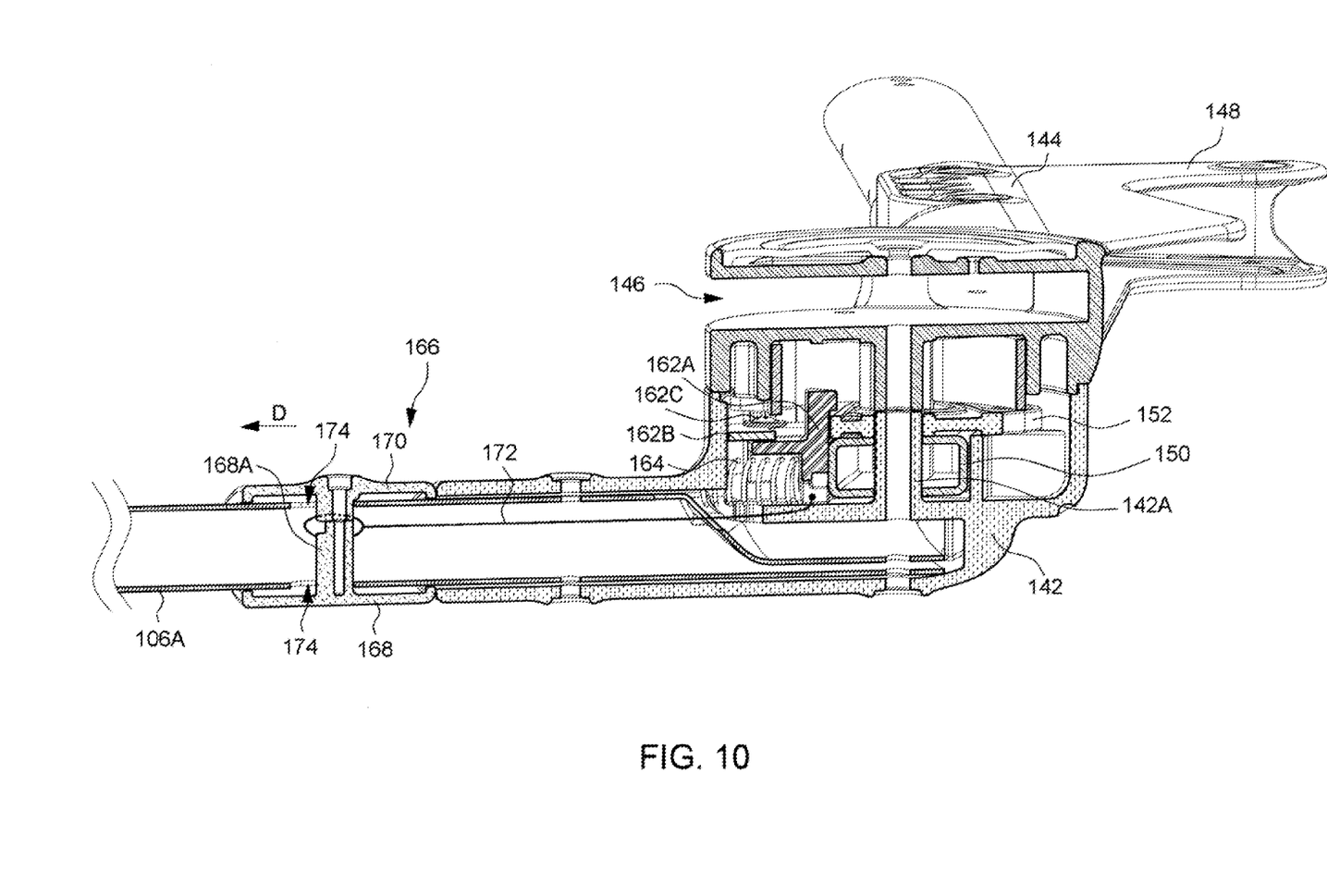
FIG. 10 is a cross-sectional view taken along a radial section illustrating the assembly of the stop mechanism.

The second abutting element 162 can be constructed as a movable abutting element assembled in the inner cavity 142B of the first coupling element 142, for example at a location radially distant from the shaft portion 142A. The second abutting element 162 can include a slider element 162A that may be assembled via a fixture 162B secured with the first coupling element 142 through two screws 162C. The fixture 162B can define a slot 162D into which the slider 162A is held and guided in movement along a direction approximately radial relative to the shaft portion 142A.

As shown in FIG. 10, the spring 164 can be a compression spring that is disposed between the slider element 162A and a peripheral sidewall of the inner cavity 142B. The spring 164 can bias the slider element 162A to a position that would cause the slider element 162A to come in contact against the first abutting element 160 during adjustment of the handle 106.

For disengaging the slider element 162A, the release actuator 166 is provided on the handle 106. The release actuator 166 can be operatively connected with the slider element 162A via a transmission cable 172. The release actuator 166 can include a movable sleeve 171 that is formed by the assembly of first and second sleeve bodies 168 and 170. An inner side of the first sleeve body 168 can form a post 168A that passes through two elongated slots 174 formed on opposite sides of the handle side segment 106A, and connect with the second sleeve body 170. The transmission cable 172 can have a first end anchored with the slider element 162A, and a second end remotely anchored with the post 168A of the sleeve 171.

Referring again to FIG. 10, when the release actuator 166 is operated by sliding the sleeve 171 in the direction D relative to the side segment 106A of the handle 106, the slider element 162A can be drawn by the transmission cable 172 to slide away from the shaft portion 142A and compress the spring 164. The slider element 162A can be thereby shifted to a disengaged position out of contact with the first abutting element 160, which can permit rotation of the handle 106 in either direction without any obstruction. When the release actuator 166 is released, the spring 164 can urge the slider element 162A toward the shaft portion 142A to a position enabling its contacting with the first abutting element 160.

Figure 8:
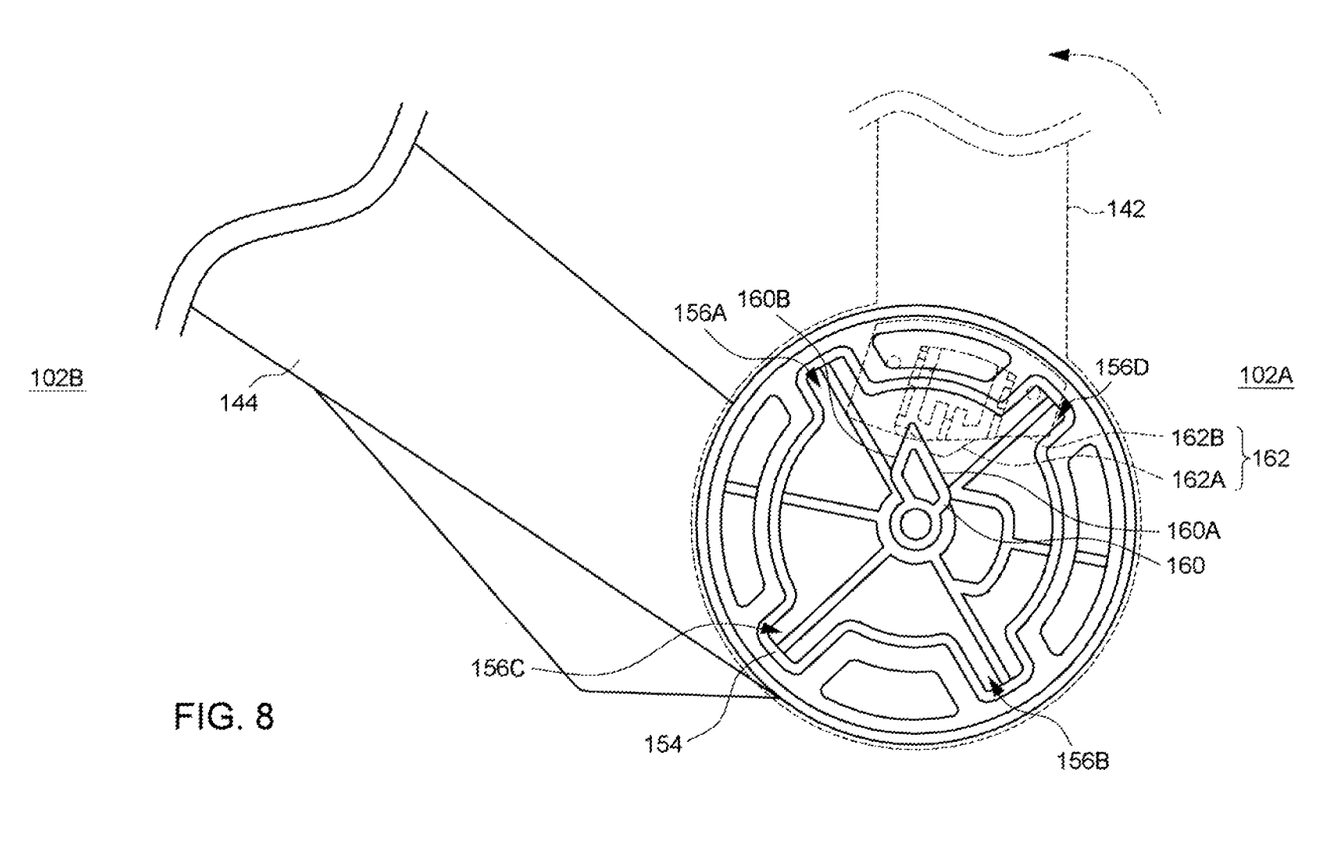
FIG. 8 is a schematic view illustrating an intermediate position of the handle corresponding to a contact occurrence between the first and second abutting elements.

FIG. 8 is a schematic view illustrating an intermediate position of the handle 106 corresponding to a contact occurrence between the first and second abutting elements 160 and 162. For clarity, only the first abutting element 160 and the coupling bracket 144 associated with the second coupling frame 112 are partially represented with solid lines, whereas the second abutting element 162 and the first coupling element 142 associated with the handle 106 are partially drawn with phantom lines. The position of the first abutting element 160 is such that when the handle 106 is adjusted from the first position shown in FIG. 2 toward the second position shown in FIG. 3, the slider element 162A can move along with the handle 106 to come in abutment against the first sidewall 160A of the first abutting element 160. This abutment between the first and second abutting elements 160 and 162 creates an obstruction that can stop the handle 106 in an intermediate position sufficiently away from the second frame portion 112 to prevent finger pinching. It is worth noting that while this obstruction can block rotation of the handle 106 toward the second position, it still permits rotation of the handle 106 in a reverse direction toward the first side 102A. Therefore, the intermediate position is only a temporarily stop, and does not constitute an adjusted position of the handle 106 for use.

To completely adjust the handle 106 to the second position, the release actuator 166 has to be manually operated to move the slider element 162A to the disengaged position out of contact with the first abutting element 160. Only then the handle 106 can be rotated from the intermediate position to the second position inclined toward the second frame portion 112.

Figure 9:
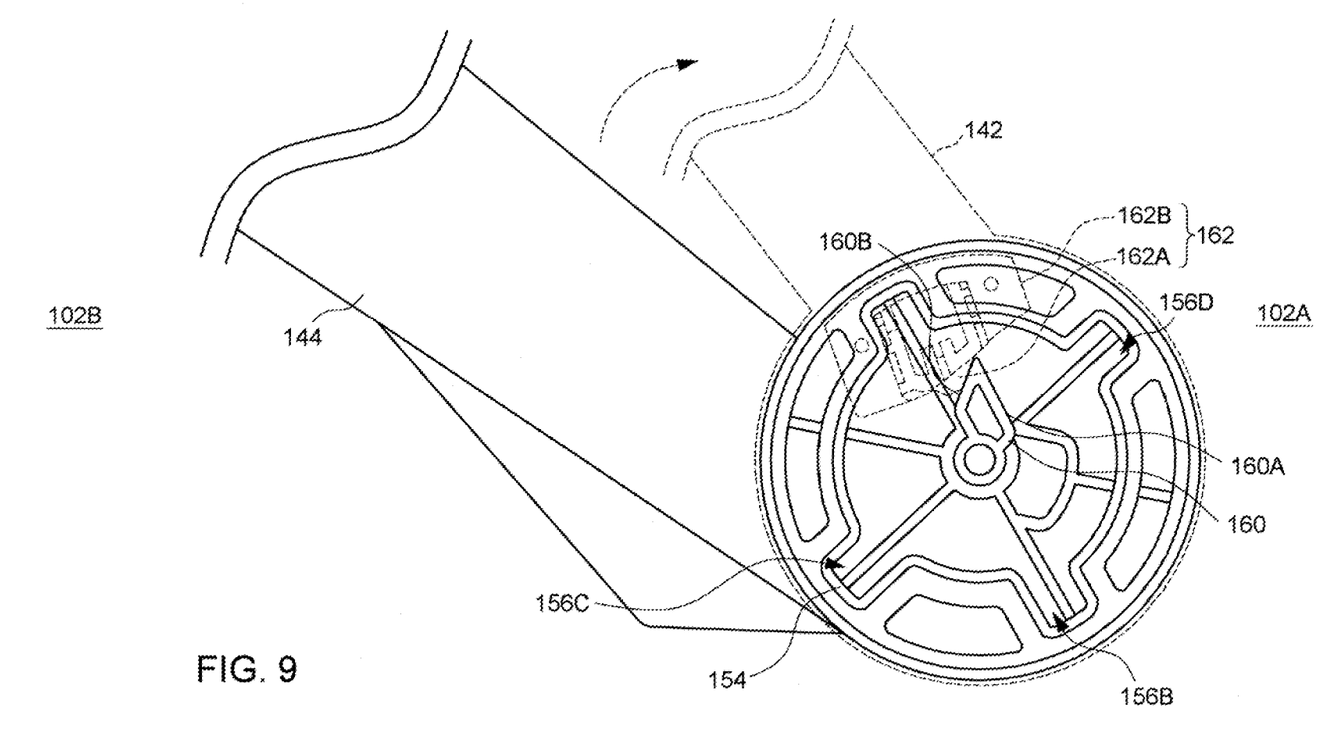
FIG. 9 is a schematic view illustrating the handle being adjusted toward the first position shown in FIG. 2.

FIG. 9 is a schematic view illustrating the handle 106 being adjusted toward the first position shown in FIG. 2. When the handle 106 is reversely adjusted from the second position toward the first position, the slider element 162A moving along with the handle 106 can come into contact against the beveled second sidewall 160B of the first abutting element 160, which pushes the slider element 162A in a direction away from the first abutting element 160 to compress the spring 164. As a result, the handle 106 is not stopped at the intermediate position of the first abutting element 160 and can continue to rotate without obstruction until it reaches the first position.

Exemplary use of the stop mechanism 134 in the adjustment of the handle 106 is described hereafter with reference to FIGS. 2-4 and 8-10. In a first step, the handle 106 can be rotated relative to the support frame 102 from the first position (i.e., inclined toward the first side 102A of the support frame 102 as shown in FIG. 2) toward the second position (i.e., inclined toward the second side 102B of the support frame 102 as shown in FIG. 3).

In a second step, before the handle 106 reaches the second position, the slider element 162A of the second abutting element 162 moving along with the handle 106 comes in abutment against the first sidewall 160A of the first abutting element 160, which forces the handle 106 to stop at the intermediate position away from the second frame portion 112.

In a third step, since the handle 106 is stopped, the caregiver can verify that there is no risk of finger pinching, and then manually operate the release actuator 166 to disengage the slider element 162A out of contact with the first abutting element 160. After the engaged state of the stop mechanism 134 is removed, the handle 106 can be rotated until it reaches the second position inclined toward the second frame portion 112.

While the handle 106 is adjusted from the first side 102A toward the second side 102B, the stop mechanism 134 provided in the hinge structure 109 can therefore arrest the handle 106 in an intermediate position at a suitable angle away from the second frame portion 112. The caregiver can thus make sure that there is no risk of finger pinching, and then disengage the stop mechanism 134 so that the handle 106 can rotate in safe manner to the second position. Because the disengagement of the stop mechanism 134 requires a manual operation, the occurrence of finger pinching due to accidental rotation of the handle 106 can be effectively prevented. Accordingly, the infant carrier apparatus 100 can be safer in use.

While the handle 106 is adjusted from the second position shown in FIG. 3 to the first position shown in FIG. 2, the moving slider element 162A can contact against the beveled second sidewall 160B, which pushes the slider element 162A away and allows the handle 106 to continuously rotate without obstruction toward the first side 102A of the support frame 102. No manual disengagement of the stop mechanism 134 is therefore required in the direction of adjustment from the second side 102B to the first side 102A of the support frame 102.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. An infant carrier apparatus comprising:
    a support frame having opposite first and second sides;
    a handle pivotally coupled with the support frame, wherein the handle is operable to rotate relative to the support frame between a first position inclined toward the first side, and a second position inclined toward the second side;
    a hinge structure pivotally connecting the handle with the support frame, the hinge structure including a coupling bracket affixed with a portion of the support frame, and a coupling element affixed with the handle;
    a latch unit assembled between the coupling bracket and the coupling element, the latch unit being operable to lock the handle with the support frame in either of the first and second position; and
    a stop mechanism operable independently from the latch unit to stop the handle at an intermediate position located between the first and second position, the stop mechanism including a first abutting element coupled with the support frame, and a second abutting element coupled with the handle,
    wherein a displacement of the handle from the first position toward the second position drives the second abutting element to move toward the first abutting element until the first and second abutting elements abut against each other to stop the handle at the intermediate position, and wherein a displacement of the handle from the second position toward the first position drives the second abutting element to move toward the first abutting element, and causes the second abutting element to automatically disengage from the first abutting element so that the handle is allowed to continuously travel past the first abutting element.

2. The apparatus according to claim 1, wherein the support frame comprises a first frame portion defining front legs, and a second frame portion, each of the first frame portion, the second frame portion and the handle respectively has a U-shape with left and right side segments that are respectively connected with a hinge structure, whereby the second frame portion and the handle are respectively operable to rotate relative to the first frame portion.

3. The apparatus according to claim 2, wherein the second frame portion is inclined from the hinge structure toward the second side, when the support frame is in a deployed state.

4. The apparatus according to claim 2, wherein the handle in the second position is located adjacent and substantially parallel to the side segments of the second frame portion.

5. The apparatus according to claim 2, further comprising a third frame portion defining rear legs, the third frame portion being pivotally connected with the second frame portion.

6. The apparatus according to claim 1, wherein the first abutting element is affixed with the support frame, and the second abutting element is movably assembled with the handle.

7. The apparatus according to claim 1, wherein the first abutting element comprises a first and second sidewall contiguous to each other, the second sidewall being beveled from the first sidewall, whereby the second sidewall is adapted to come in contact with and push the second abutting element in a direction away from the first abutting element as the handle is rotated from the second position toward the first position.

8. The apparatus according to claim 1, wherein the stop mechanism further comprises a spring connected with the second abutting element at the side of the handle, the spring biasing the second abutting element into contact with the first abutting element when the handle is in the intermediate position.

9. The apparatus according to claim 8, wherein the rotation of the handle from the second position toward the first position drives the second abutting element to come into contact with the first abutting element such that the first abutting element pushes the second abutting element to move in a direction that compresses the spring, whereby allowing the handle to continuously rotate and travel past the intermediate position toward the first position.

10. The apparatus according to claim 1, wherein the handle further comprises a release actuator that is connected with the second abutting element, the release actuator being operable to disengage the stop mechanism and allow the handle to rotate from the intermediate position to the second position.

11. The apparatus according to claim 10, wherein the release actuator comprises a sliding sleeve movably assembled with the handle, the sleeve being connected with the second abutting element via a transmission cable.

12. The apparatus according to claim 1, wherein the stop mechanism is assembled between the coupling bracket and the coupling element.

13. The apparatus according to claim 12, wherein the stop mechanism further comprises a fixture fixedly secured with the coupling element and having a slot through which the second abutting element is movably assembled.

14. The apparatus according to claim 1, wherein the latch unit comprises a latching bolt movably assembled with a casing, and an interior of the coupling bracket further comprises a holder cage having at least two locking slots, the latching bolt being adapted to engage with either of the two locking slots to lock the handle at either of the first and second position.

15. A method of adjusting an infant carrier apparatus, wherein the infant carrier apparatus includes a support frame having opposite first and second sides, and a handle adjustable between a first position inclined toward the first side and a second position inclined toward the second side, the method comprising:
providing a stop mechanism that has an obstructing state capable of blocking the handle at an intermediate position between the first and second positions;
rotating the handle in a first direction from the first position toward the second position until the handle is stopped by the stop mechanism at the intermediate position before the second position;
removing the obstructing state of the stop mechanism and continuing to rotate the handle in the first direction from the intermediate position to the second position; and
rotating the handle in a second direction from the second position toward the first position, wherein the rotation of the handle in the second direction causes the stop mechanism to automatically remove the obstructing state, such that the handle is allowed to continuously rotate in the second direction until the second position is reached.

16. The method according to claim 15, wherein the stop mechanism comprises:
a first abutting element affixed with the support frame; and
a second abutting element movably assembled with the handle, wherein the rotation of the handle from the first position toward the second position causes the second abutting element to move continuously toward the first abutting element until the second abutting element abuts against the first abutting element to stop the handle at the intermediate position.

17. The method according to claim 16, wherein the step of removing the obstructing state of the stop mechanism comprises operating a release actuator provided on the handle, whereby causing the second abutting element to disengage from the first abutting element.

18. An infant carrier apparatus comprising:
a support frame having opposite first and second sides;
a handle pivotally coupled with the support frame, wherein the handle is operable to rotate relative to the support frame between a first position inclined toward the first side, and a second position inclined toward the second side;
a latch unit operable to lock the handle with the support frame in either of the first and second position; and
a stop mechanism operable independently from the latch unit to create an obstruction that interrupts a course of the handle in a first direction from the first position toward the second position, and to automatically remove the obstruction as a result of a rotation of the handle in a second direction from the second position toward the first position.

19. The infant carrier apparatus according to claim 18, wherein the stop mechanism includes a first and a second abutting element, one of the first and second abutting elements being coupled with the support frame, the other one of the first and second abutting elements being coupled with the handle, a rotation of the handle from the first position toward the second position causes the second abutting element to move continuously toward the first abutting element until the second abutting element abuts against the first abutting element to stop the handle at an intermediate position between the first and second positions, and the second abutting element is further operable to disengage from the first abutting element to remove the obstruction and allow further displacement of the handle from the intermediate position to the second position.

* * * * *